United States Patent [19]

Keown

[11] 3,878,154

[45] Apr. 15, 1975

[54] MASTICS DERIVED FROM NEOPRENE LATEX

[75] Inventor: Robert William Keown, Wilmington, Del.

[73] Assignee: E. I. du Pont de Nemours and Company, Wilmington, Del.

[22] Filed: Oct. 30, 1973

[21] Appl. No.: 411,299

Related U.S. Application Data

[63] Continuation-in-part of Ser. Nos. 308,854, Nov. 22, 1972, and Ser. No. 370,712, June 18, 1973, abandoned.

[52] U.S. Cl. ........ 260/29.7 N; 260/29.7 E; 260/29.7 EM; 260/29.7 H; 260/29.7 PT; 260/34.2
[51] Int. Cl. ...... C08d 5/02; C08d 7/18; C08f 47/16
[58] Field of Search ....... 260/29.7 EM, 29.7 PT, 34, 260/2, 29.7 N, 29.7 E, 29.7 H

[56] References Cited
UNITED STATES PATENTS 2,809,948   10/1957   Hunter et al. ............... 260/29.7 EM
3,479,313   11/1969   Kreider ................. 260/29.7;34.2 X

FOREIGN PATENTS OR APPLICATIONS 1,018,376   1/1966   United Kingdom

OTHER PUBLICATIONS

Martens, "Emulsion and Water-Soluble Paints and Coatings," p. 103 (Reinhold 1964), TP 936 M37.

Primary Examiner—Morris Liebman
Assistant Examiner—T. DeBenedictis, Sr.

[57] ABSTRACT

Mastics having excellent adhesive properties are produced by mixing a directly prepared neoprene aqueous emulsion containing 50–65 percent solids by weight and an organic, water-immiscible neoprene solvent containing a dispersed (dissolved) adhesion promoting resin in the presence of an amphoteric or cationic surfactant until the viscosity of the mixture has increased into the mastic range and a water-in-oil type of dispersion is obtained.

10 Claims, No Drawings

MASTICS DERIVED FROM NEOPRENE LATEX

CROSS-REFERENCES TO RELATED APPLICATIONS

This application is a continuation-in-part of my prior application Ser. No. 308,854, filed Nov. 22, 1972, and my prior application Ser. No. 370,712, filed June 18, 1973 and now abandoned.

BACKGROUND OF THE INVENTION

The term "mastic" as used herein refers to a viscous, paste-like or putty-like adhesive or sealant useful for installing floor or wall tile and similar applications and applicable with a knife, trowel, or gun. Neoprene mastics are known to be useful in the adhesive art and are of two types, latex-based and solvent-based. Both types have outstanding resistance to degradation by weather, oxygen, ozone, solvents, and oils.

Latex mastics have been made by compounding neoprene latex with such components as fillers, adhesion-promoting resins, antioxidants, metal oxides, and curing agents, using conventional latex compounding techniques. The resultant compounded latex, which comprises a dispersion of neoprene and the other above-named components in a continuous water phase, is suitable without further processing for use in adhesive applications where a mastic is needed.

Solvent-based neoprene mastics comprise a solution of neoprene in one or more of its solvents, with the compounding components above-mentioned either dissolved or dispersed therein. Mastics of this type can be prepared by mixing dry, solid neoprene with the solvent and compounding components in a powerful internal mixer such as the sigma-arm type until the neoprene is completely dissolved or dispersed in the solvent. In solvent-based mastics, in contrast to the latex mastics, the solvent is the continuous phase, and no water is present.

Solvent-based neoprene mastics are superior to neoprene latex mastics in that they have faster drying rates and develop higher adhesive bond strength. On the other hand, the latex mastics are easier to apply because they have better application rheology, that is, they have lower viscosity and nerve. Moreover, the latex mastics are less costly to prepare because neoprene latexes are advantageously directly produced by polymerizing chloroprene monomer in aqueous emulsion and to make the latex mastics from such neoprene latexes requires no prior isolation of the polymer from its latex nor any costly internal mixing equipment.

Prior to applicant's invention there has been a need for a process and product which would achieve the advantages of both the solvent-based and the latex-based neoprene mastics. It has been proposed in Campion and Yardley U.S. Pat. No. 3,574,161, for instance, to make a solution of a polymeric material such as neoprene in an organic solvent by mixing (A) a dispersion of polymeric particles in water, in which the particles are dispersed with the assistance of an ionic dispersing agent, with (B) a dispersion of the organic solvent in water, in which the solvent has been dispersed using a high degree of shear with the assistance of a dispersing agent of opposite polarity to the first-mentioned dispersing agent, and separating the water layer so formed from the organic solvent layer containing the polymeric material. This accomplishes transfer of the neoprene from the aqueous dispersion (latex) to a solution in the organic solvent, but it still requires a large power input to achieve the necessary high degree of shear when making the organic solvent-water dispersion. It also requires water separation and removal after the mixing step.

In Murphy et al. U.S. Pat. No. 1,995,319, there is described a method for producing, from an aqueous dispersion of rubber or the like, a composition comprising rubber dispersed or dissolved in a rubber solvent and the water of the constituent aqueous dispersion dispersed therein as the dispersed phase. This method requires admixing an aqueous dispersion of the rubber (a latex) with an aqueous emulsion of a rubber solvent, either in the absence of a stabilizing agent or in the presence of such a quantity of stabilizing agent so as to allow the ultimate coagulation of the aqueous dispersion to take place. Addition of neoprene latex to the solvent as described in the example of this reference causes the formation of coagulum which is difficult to disperse and imparts an undesirable coarseness of texture to the composition.

British Pat. No. 1,018,370 seeks to provide a process for making polymer solutions from polymer latexes without first coagulating the polymer. In this method, a solvent phase substantially insoluble in water is caused to act upon polymer which is present as a cream. Coagulation is avoided, but, if necessary, conditions are created which promote the creaming of the latex. The polymer phase swells and/or dissolves. In any case, a swollen and/or dissolved polymer mass is obtained, and this mass is caused to segregate, that is, to split into a layer of organic material and an aqueous layer. The creaming of the latex is an involved and delicate procedure not at all adapted for use in making mastics at the place where they are to be used, for example, as tile-setting adhesives.

SUMMARY

Now according to the present invention, the above-enumerated disadvantages of prior art processes are avoided, and mastics having excellent adhesive properties are produced by mixing a high-solids neoprene latex, directly prepared by polymerizing chloroprene in an aqueous emulsion, and an organic water-immiscible neoprene solvent containing an adhesion promoting resin in the presence of an amphoteric or cationic surfactant. The surfactant may be dispersed (dissolved) in the organic, water-immiscible neoprene solvent, or if it is amphoteric or a polyoxyethylated alkyl amine it may be dispersed (dissolved) directly in the latex. The mixing of the solvent and the latex in the presence of the surfactant is continued until a water-in-oil type dispersion is obtained and the viscosity of the mixture has increased into the mastic range.

To operate this process, the expensive, high-power-consuming equipment of the prior art is not required. Prior isolation of the polymer is also not necessary, hence the need for water-separation can be dispensed with. In addition, the resulting mastic forms adhesive bonds with strengths and fast drying rates approaching those of conventional solvent-based mastics. Preferred embodiments, furthermore, exhibit the superior application rheology of latex mastics.

Although prepared by latex compounding techniques, mastics prepared by processes of this invention differ from conventional latex mastics in that the neoprene solvent is the continuous phase in the composition, and the water is a dispersed phase. The fact that they contain a dispersed water phase similarly distinguishes them from conventional solvent-based mastics, which have a neoprene-organic solvent solution as the continuous phase but contain no dispersed aqueous phase.

The particular utility of the processes of the present invention lies in the simplicity of their use. The initial mixing of the latex, neoprene solvent, and surfactant can be carried out in minimal mixing equipment — a simple kettle or drum with a paddle or propellor agitator will do. During and immediately after this initial mixing step, the composition is a fluid of low viscosity. Its viscosity increases with time, however, and agitation is continued until the composition has taken on the pasty consistency characteristic of a mastic. This usually occurs between 30 seconds and 1 hour after mixing is initiated. The mastic remains workable for an ample period of time to permit its easy use for such purposes as adhesively setting tile and the like, that is, it does not gel prematurely, as do many otherwise useful mastics.

DESCRIPTION OF THE PREFERRED EMBODIMENTS

The high-solids neoprene latex used in making mastics according to the present invention contains about from 50–65 percent by weight of neoprene solids. It is directly prepared in high-solids form, that is, it is not creamed from a lower-solids latex wherein a relatively dilute chloroprene emulsion is polymerized and the resulting latex is concentrated by removal of either water or the aqueous phase. It can be made by polymerizing a concentrated chloroprene dispersion in an aqueous alkaline emulsion to at least about 80 percent conversion, using conventional emulsifiers such as rosin or rosin derivative soaps. The use, in related processes, of latexes having a polymer content of 30–70 percent by weight without reference to the manner of achieving polymer concentration in the latex is disclosed in U.S. patent application Ser. No. 240,766, filed Apr. 3, 1972 by William Lee Fichteman.

Especially suitable latexes are made by processes in which chloroprene is polymerized in an aqueous emulsion containing specified proportions of potassium or mixed sodium and potassium salts of (a) disproportionated wood rosin, (b) a formaldehyde condensate of a naphthalene sulfonic acid and (c) polymerized unsaturated fatty acid, all as more particularly set forth in claim 1 of U.S. Pat. No. 3,651,037 to Snow, Jr., said disclosure being incorporate herein by reference. Alternatively, the latex can be made by similar processes defined in claim 1 of Snow, Jr. U.S. Pat. No. 3,651,038, said processes including in the alkaline, aqueous polymerization emulsion specified proportions of the potassium salts or a mixture of the sodium and potassium salts of (1) wood rosin acid, (2) a formaldehyde condensate of a naphthalene sulfonic acid, and (3) a polymerized, unsaturated, fatty acid, the disclosures of said U.S. Pat. No. 3,651,038 also being incorporated herein by reference.

Still another way in which the high-solids neoprene latex can be prepared is in accordance with claim 1 of Canadian Pat. No. 894,848, issued Mar. 7, 1972 to Harrell, Jr. In this particular method, there is present in the emulsion during polymerization of the chloroprene the potassium or mixed sodium and potassium salts of (a) disproportionated wood rosin and (b) a formaldehyde condensate of a naphthalene sulfonic acid, the proportion of formaldehyde condensate being within specified maxima and minima. The disclosures of this Canadian patent are incorporated herein by reference.

The comonomer optionally copolymerized with the chloroprene in each of the above-identified patents is omitted in the present latexes.

In one preferred aspect of the invention, the high-solids latex contains an amphoteric surfactant in the proportion of about 0.25–10 parts by weight per 100 parts by weight of neoprene. The amphoteric surfactant can be a composition as disclosed hereinbelow.

In another preferred aspect of the invention, the high-solids latex contains a polyoxyethylated alkyl amine or a mixture of a polyoxyethylated alkyl amine with a polyoxyethylated sorbitol oleate in the proportion of about 0.25–10 parts by weight per 100 parts by weight of neoprene.

Surfactants useful in practicing the invention are cationic or amphoteric. In the cationic class are nitrogen hydrocarbyl compounds preferably selected from the group consisting of those having the following structures:

| FORMULAE | WHERE: |
|---|---|
| (I) 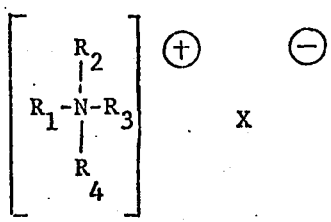 | $X$ is conjugate base of strong acid, $R_1$ is $C_8$ to $C_{20}$ hydrocarbyl, and $R_2$, $R_3$, and $R_4$ are hydrocarbyl groups, the total number of carbon atoms in which does not exceed 6. Any two of these groups may be joined to form a cyclic structure including nitrogen. |
| (II) 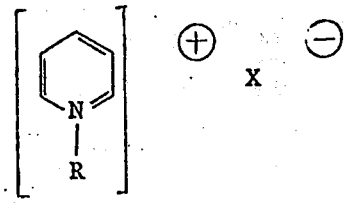 | $X$ is as defined in (I) and $R$ is $C_8$ to $C_{20}$ hydrocarbyl. |

(III) 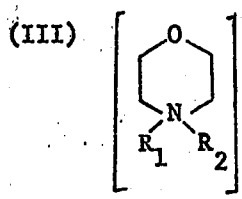 X

X is as defined for (I), $R_1$ is a hydrocarbyl group of 8 to 20 carbon atoms, and $R_2$ is methyl, ethyl, or 2-hydroxyethyl.

(IV) 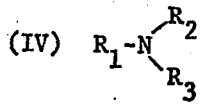

$R_1$ is $C_8$ to $C_{20}$ hydrocarbyl and $R_2$, and $R_3$ are hydrogen, methyl, or ethyl.

(V) 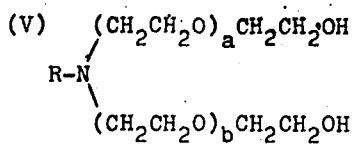

R is $C_8$ to $C_{20}$ hydrocarbyl, and a + b is 0 to 13.

(VI) 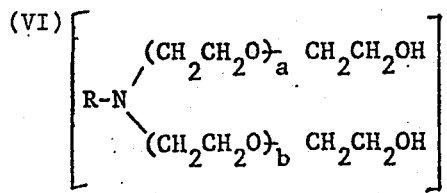 X

X is as defined for (I), R is $C_8$ to $C_{20}$ hydrocarbyl, and a + b is 0 to 13.

(VII) 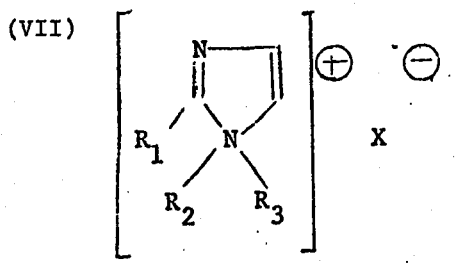 X

X is as defined for (I), $R_1$ is $C_8$ to $C_{20}$ hydrocarbyl, $R_2$ is 2-hydroxyethyl, and $R_3$ is ethyl.

Amphoteric surfactants used in this invention include the following:
1. Amines and quaternary ammonium compounds having an anionic site and a cationic site and having a hydrocarbyl group of at least 6 carbon atoms
2. C-cetyl betaine
3. N-cetyl betaine
4. N-(c-coco-amidopropyl)betaine
5. N-stearyl betaine
6. Stearyl ammonium sulfonic acid betaine
7. Cetyl ammonium sulfonic acid betaine
8. N-coco-beta-aminopropionic acid
9. N-dodecyl glycine
10. N-hexadecyl glycine
11. N-octadecyl glycine
12. N-dodecyl alanine
13. N-dodecyl beta alanine
14. N-hexadecyl beta alanine
15. 2-Amino-octadecanoic acid
16. 2-amino myristic acid
17. Heptadecenyl(2-hydroxy ethyl)imidazolinium acetate According to the present invention, either the amphoteric or cationic surfactant can be dispersed in an organic, water-immiscible neoprene solvent and then mixed with the neoprene latex. The surfactant should be dispersed sufficiently to maintain substantial homogeneity; preferably it should be colloidally dispersed or molecularly dispersed as a true solution. Whenever reference is made herein to dispersion, the term will be understood to have this meaning.

If the surfactant is amphoteric, or if it is a polyoxyethylated alkyl amine, it can be dispersed directly in the neoprene latex prepared as described above. With cationic surfactants other than polyoxyethylated alkyl amines, there is no such option: they are incompatible with the latex and cause coagulation. Cationic surfactants are added as dispersions in solvents; however, other desirable components of the mastic can be added with such dispersions.

The presence of the surfactant in the mixtures as above described shortens the time required for the freshly mixed composition to acquire a mastic consistency and gives mastics having improved application rheology (i.e., lower viscosity, greater smoothness, less nerve). The amount of surfactant used generally exceeds 0.25 part by weight per 100 parts by weight of neoprene, 2–6 parts being preferred. The maximum amount is not critical, but no further benefit is seen at amounts greater than 10 parts. Preferred surfactants include condensation products of long-chain alkyl primary amines with ethylene oxide and their quaternary ammonium salts.

The water-immiscible neoprene solvent used in the processes of the present invention can be any solvent or mixture of solvents in which an uncross-linked neoprene is soluble to the extent of 10 parts or more by weight per 100 parts of solvent, and which is not soluble in water to the extent of 5 parts or more by weight per 100 parts of water. Preferred solvents are those having a solubility parameter between 8–9.5 and a hydrogen bonding index between 2–5.5, both values being determined as described in the trade bulletin *DuPont Elastomers in Adhesives* in the article by J. F. Hagman entitled "Solvent Systems for Neoprene — Predicting Solvent Strength," March, 1964, the disclosures of which are incorporated herein by reference.

Representative neoprene solvents useful in the present invention are benzene, toluene, xylene, turpentine, and a mixture of toluene and cyclohexane preferably in the ratio of 60-40 by volume.

The amount of solvent used in a process of the present invention should be so chosen that the total solids content of the ultimate mastic composition produced is between 15-80 percent by weight, based on the total weight of the composition; furthermore, the amount of solvent should at least equal on a weight basis the amount of neoprene in the mastic. Below 15 percent solids and above 80 percent solids, the mastics have viscosities that are too low and too high, respectively, for many applications. Preferred mastics have total solids contents between 40-60 percent.

Other components can advantageously be used in the mastics of this invention for their known effects. Thus, an adhesion-promoting resin may be used. Hundreds of such resins are well known in the adhesive art. Representative examples are terpenes, terpene-phenolic resins, cumarone indene resins, phenolic-modified cumarone-indene resins, rosin-modified phenolic resins, modified rosin, rosin esters, and pentaerythritol esters. Preferred resins are those which contain free carboxyl or phenolic hydroxyl functional groups, such as rosin-modified phenolic resins, modified rosins, and terpene-phenolic resins, and their reaction products with magnesium oxide. The quantity of resin used is not critical but generally falls between 10-200 parts per 100 parts of neoprene, all quantities being on a weight basis, with 20-60 parts preferred.

Fillers are useful in the present invention, and any filler having conventional utility in the mastic and adhesives art can be employed. Included among the suitable fillers are clay, calcium carbonate, diatomaceous earth, silica flour, and carbon black. The amount of filler is not critical but generally is between 50-300 parts per 100 parts by weight of neoprene. The amount of filler usually is varied with the solvent, being increased as the quantity of solvent is increased. Carbon black is normally used only for coloring at low concentrations varying from 3-10 parts, but it may be used in greater quantity, if desired.

Other compounding ingredients, such as magnesium and zinc oxides, antioxidants and curing agents are included in the mastic formulation to improve the physical properties and the durability of the adhesive bond resulting from the use of the mastic. These materials are those conventionally used in neoprene latex technology.

The preferred embodiment of the present invention involves selection of a directly polymerized high-solids neoprene latex as specified hereinabove, an adhesion-promoting resin containing free carboxyl or phenolic hydroxyl groups or its reaction product with magnesium oxide, and a surfactant which is a condensation product of one mole of $C_{12}$ to $C_{18}$ straight-chain alkyl primary amine with from 2-15 moles of ethylene oxide, either alone or in admixture with a polyoxyethylated sorbitol oleate, or a quaternary ammonium salt of said amine for operation of the process as already described. Mastics obtained by this selection attain desired viscosity after only 0.5-5 minutes of stirring following mixing of the solvent-filler dispersion with the latex, and possess superior smoothness and application rheology.

EXAMPLES

The invention will be better understood by reference to the following illustrative examples, in which all parts are by weight per 100 parts by weight of neoprene unless otherwise indicated.

EXAMPLE 1

Rosin-modified phenolic resin (30 g) and a tert-butyl phenolic-formaldehyde resin (40.0 g) are dissolved in 236 g of a mixture of toluene and cyclohexane, of which 57.4 percent by volume is toluene. In a separate vessel, a mixture of 4.0 g of magnesium oxide, 5.0 g of zinc oxide, 140 g of kaolin, of which 78 percent has a particle size of less than 2 microns, and 2.0 g of 2,2'-methylene-bis(4-methyl-6-t-butylphenol) are wet with 236 g additional of toluene-cyclohexane mixture which has the same volume composition and has dispersed therein 3.0 g of surfactant (listed below). The clay slurry and resin solution are combined, and the mixture is poured into 167 g of neoprene latex containing 60 percent solids. The latex is contained in a one-quart paint can and is stirred by hand with a spatula as the mixture is added. Immediately after addition of the mixture to the latex has been completed, the composition is a fluid of low viscosity much resembling the original latex. Viscosity increases sharply with passage of time beyond this point, and after approximately 2-6 minutes, it has reached that of the mastic range, where it levels off and becomes approximately constant with time. Stirring of the composition is continued during this 2-6 minute time period following completion of addition. Mastic compositions thus obtained are ready for use as adhesives and sealants and exhibit exceptionally good application rheology and adhesive properties.

Surfactants that have given excellent mastics by this procedure are N-lauryl-beta-alanine, N-cetyl-N-ethylmorpholinium ethosulfate, C-cetylbetaine, C-decylbetaine, condensation product of coco amine (1 mole) with 2 moles of ethylene oxide, and lauryl ammonium sulfonic acid betaine.

EXAMPLE 2

In 167 g of 60 percent neoprene latex contained in a one-quart paint can, 3.0 g of an amphoteric surfactant or a polyoxyethylated alkyl amine, as hereinafter described, is dissolved. A slurry of clay, MgO, and ZnO in the solvent solution of resins and antioxidant is prepared according to the description in Example 1, except the surfactant is deleted. The slurry is added to the latex with hand-stirring of the latex. About 2-6 minutes after completion of mixing of the slurry with the latex, a mastic is obtained exhibiting excellent application rheology and adhesive properties.

Surfactants that have given excellent mastics by this procedure are N-lauryl-beta alanine, C-cetylbetaine, C-decylbetaine, lauryl ammonium sulfonic acid betaine, and polyoxyethylated alkyl amine (Atlas G-3780-A). Mixtures of polyoxyethylated alkyl amine with polyoxyethylated sorbitol hexaoleate (Atlas G-1186) in various proportions including equal parts by weight, as well as a mixture of polyoxyethylated fatty amine and polyoxyethylated sorbitol oleate known as Atlas G-2090, have similarly given excellent mastics, in each case using 3 g total surfactant as above. The above-mentioned Atlas G compositions are products of ICI America, Inc. When using a polyoxyethylated fatty amine, alone or in admixture, it is advantageous to first disperse it in water to a concentration of about 25 percent by weight before adding it to the latex.

I claim:

1. In a process for producing a mastic adhesive the step comprising mixing a directly prepared aqueous emulsion of neoprene containing 50–65 percent by weight solids with an organic water-immiscible neoprene solvent containing dissolved adhesion-promoting resin in the presence of a cationic or amphoteric surfactant until the mixture has increased in viscosity to the mastic range and a water-in-oil type dispersion is obtained.

2. The process of claim 1 in which the surfactant is amphoteric or a polyoxyethylated alkyl amine and the surfactant is dissolved in either the aqueous emulsion of neoprene or in the organic water-immiscible neoprene solvent before the mixing of the emulsion and the solvent.

3. The process of claim 1 in which the surfactant is cationic and it is dissolved in the organic water-immiscible neoprene solvent before the mixing of the emulsion and the solvent.

4. In a process for producing a neoprene latex composition especially adapted for use in making mastics having excellent adhesive properties, the step comprising mixing directly into an aqueous emulsion of directly prepared neoprene latex containing 50–65 percent solids an amphoteric surfactant or a polyoxyethylated alkyl amine surfactant until the surfactant is dispersed in the latex, the proportion of surfactant being from 0.25–10 parts per 100 parts of neoprene.

5. A process of claim 4 in which the amphoteric surfactant is a polyoxyethylated fatty amine.

6. A process of claim 5 in which there is present with the polyoxyethylated fatty amine surfactant a polyoxyethylated sorbitol oleate.

7. A neoprene latex composition produced by a process of claim 4.

8. A neoprene latex composition produced by a process of claim 4 wherein the amphoteric surfactant is a polyoxyethylated fatty amine.

9. A neoprene latex composition of claim 8 in which there is present with the polyoxyethylated fatty amine a polyoxyethylated sorbitol oleate, said fatty amine and sorbitol oleate together being present in the proportion of about 3 parts per 100 parts of latex solids.

10. The process of claim 1 in which the amount of organic water-immiscible neoprene solvent is at least equal on a weight basis to the amount of neoprene.

* * * * *